May 28, 1957 R. E. ROHTERT 2,793,828
AIRPLANE INFLIGHT REFUELING APPARATUS
Filed May 18, 1953
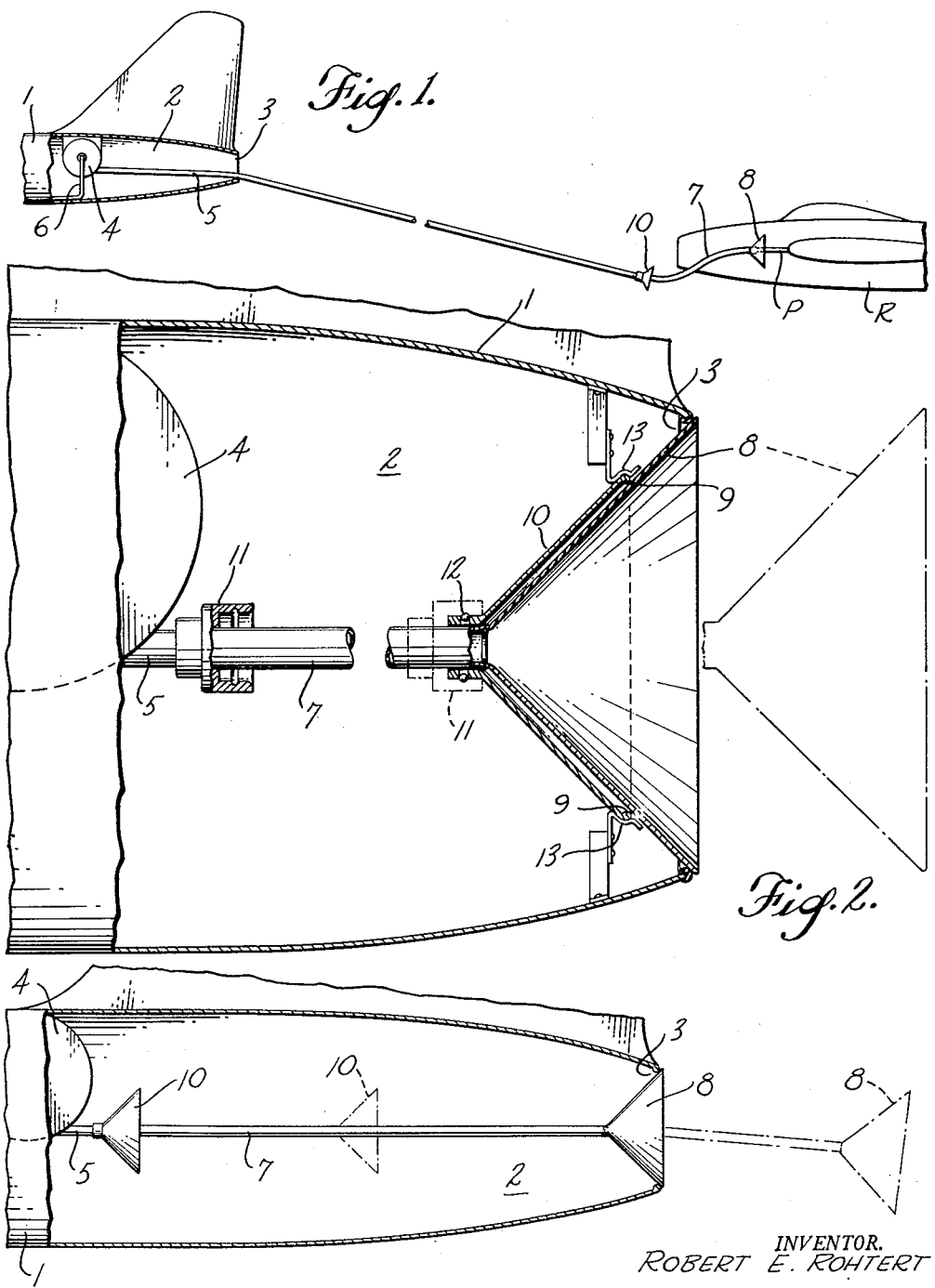
INVENTOR.
ROBERT E. ROHTERT
BY
Reynolds, Beach & Christensen
ATTORNEYS United States Patent Office 2,793,828
Patented May 28, 1957

2,793,828

AIRPLANE INFLIGHT REFUELING APPARATUS

Robert E. Rohtert, Wichita, Kans., assignor to Boeing Airplane Company, Seattle, Wash., a corporation of Delaware Application May 18, 1953, Serial No. 355,579

1 Claim. (Cl. 244—135)

Refueling of airplanes in flight is accomplished, according to the known probe-drogue method, by trailing a free, flexible hose behind a tanker airplane, to establish contact with a probe projecting forwardly from the receiver airplane. The drogue is always at the extreme rear end of the hose, because it is this hollow, conical drogue that fits over and centers the probe within it, and which by reason of the airstream flowing about it equally at all sides is held securely to its seat upon the probe.

It has been found exceedingly difficult, during the period of time required for refueling, to maintain exactly the same air speed, course, and elevation as between the tanker and the receiver airplanes. Especially is this true when a small jet-propelled, high-speed airplane must throttle down to a very low speed while it is receiving fuel from a large propeller-driven airplane, the best speed whereof is in the lowest speed range of the jet-propelled airplane. The receiver airplane is not easily controlled at such low speeds, and does not respond readily to control action, or else over-controls. There is a tendency for the receiver airplane to lag behind, and then to overtake the tanker airplane, or to fall off to one side or the other, or to rise and to sink. While the hose may be arranged, aboard the tanker airplane, for reeling out or in, either under manual or automatic control, as may be required by such relative movements of the two airplanes, not infrequently the relative movement of the receiver airplane will be momentarily at a rate which exceeds the feasible or possible rate of operation of such reeling mechanism. There is danger of breaking contact if the slack in the hose is too slight when separation of the airplanes occurs, yet on the other hand, if there is a reasonable amount of slack the sudden approach of the airplanes may produce an excessive amount of slack. When the slack becomes excessive the entire length of hose, itself rather heavy, and weighted by the contained fuel, may be whipped about by the airstream, for there is nothing to stabilize it between the point where it issues from its storage compartment in the tanker airplane and its extreme end where its drogue overlies the probe of the receiver airplane. Such whipping of the slack may break the probe, rendering completion of refueling impossible and ditching of the soon fuelless airplane quite probable, or may cause other damage. A serious and immediate fire hazard may result from breakage of the hose or from even momentary loss of contact, as a result of such whipping, or from separation arising from insufficient slack being maintained because of an attempt to avoid excessive slack.

It is apparent from the above that slack must be present in the hose, yet that the hose cannot be permitted to whip about because of such slack. By the present invention these apparently conflicting requirements are harmonized and fulfilled. This is done by stabilizing the full length of the hose, except the last several feet at its rear end, against slackening and whipping, by the location of a supplemental drogue upon the hose at such distance from its rear end, and large enough to produce a stabilizing pull upon the major length of the hose, ahead of it, by the airstream acting upon it. This leaves only the rearmost several feet of the length of the hose, between the supplemental drogue and the usual probe-seated drogue, wherein substantially all slack occurs, yet the ends of this short length are each stabilized by drogues. If the receiver airplane momentarily overtakes the tanker airplane, only this rearmost several feet of hose goes slacker. If the receiver airplane lags momentarily, slack in these rearmost several feet is usually enough to maintain contact. Even if contact is broken, or if the last several feet become quite slack, the supplemental drogue prevents the major portion of the hose, ahead of it, from whipping, and any such uncontrolled movement of the hose is confined to the last several feet, only. This short length is unlikely to cause serious damage, certainly not to compare with the damage that can be caused by whipping of the entire length of the hose.

It is an object of this invention to accomplish the above objective in a simple manner, which will add but little to the weight of the apparatus, and which in practical effect may take any one of several possible simple embodiments.

With such objects in mind, and others as will appear hereinafter, the present invention comprises the novel airplane inflight refueling system shown in the accompanying drawings, and which will be more fully described and claimed hereinafter.

Figure 1 is a side elevational view of the tail portion of a tanker airplane, partly in section, and of the forward portion of a receiver airplane, showing the system in operation, and illustrating the result of a slight overtaking by the receiver airplane.

Figure 2 is a longitudinal sectional view through a tail compartment of a tanker airplane, showing the refueling apparatus in one embodiment.

Figure 3 is a view similar to Figure 2, but showing the apparatus in a modified form.

The fuselage of the tanker airplane is shown at 1, having at its tail end a compartment 2 having a rearwardly opening aperture 3. Within the compartment 2, or conveniently thereto, is supported a reel 4, whereon may be wound a hose 5 for the delivery of fuel to a receiver airplane R. The hose would be connected as, for example, by the line 6, to fuel tanks (not shown) carried by the tanker airplane 1. The reel would be provided with means to reel it in (not shown), as is customary, and these reeling means may be automatically brought into operation by slackening of the tension in the hose 5, or the reeling may be accomplished under manual control. It is unimportant to the present invention how the reeling is to be accomplished. Likewise it is not important to the present invention whether the compartment 2 be located in the tail end of the fuselage, or, as suggested in known arrangements, in the rear portion of a nacelle, or in some other convenient place.

As is customary in such refueling apparatus, a primary drogue 8, usually of hollow conical shape with its apex forward and its opening to the rear, is securely affixed to the rear end of the hose 5. Its function is to stabilize the hose as it is reeled out into the air stream, and to establish contact with and to seat upon the tip of the hollow fuel-receiving probe P, which during refueling projects forwardly from some portion of the receiver airplane R.

According to the present invention there is provided a secondary drogue 10, of form and shape corresponding to the primary drogue 8, but preferably somewhat smaller. In operation, with the hose outreeled, the secondary drogue 10 is fixed in position a short distance forwardly of the drogue 8. Such a distance might be six or eight feet, and it would be impossible to state a precise distance which would be suitable for all purposes and occasions. In general the distance should be so short that the intervening rearmost portion 7 of the hose will have sufficient stiffness, inherently or otherwise, and be sufficiently short that it will have little tendency to whip about appreciably. Accordingly when the refueling operation is to commence, the hose is reeled out, and its trailing end is steadied, not only by the drogue 8, but also by the drogue 10. When contact is established with the probe P the hose 5 remains substantially straight, because of the pull of the drogue 10 produced by the air moving past it, and has no tendency to whip about as long as there is no slack in it. When any such slack occurs, and while it lasts, the drogue 10 still furnishes enough pull on the principal length of the hose that it will maintain this principal length substantially straight as before, and any tendency to flex will occur only in the short length 7 between the secondary drogue 10 and the primary drogue 8. This, because of the short length and relatively greater stiffness of this portion, will minimize the forces tending to cause whipping. The length 7 may be inherently of adequate stiffness, or it may be stiffened in relation to the flexibility of the remainder of the hose, forwardly thereof, to further minimize this tendency to whipping.

The drogue 10 may be permanently fixed to the hose at the predetermined distance forwardly of the drogue 8, as in the form of Figure 3, or it may be releasable from a securing means 11, such as a collar affixed to the hose 5 at the forward end of the portion 7, and having means engageable by spring-pressed balls 12 carried at the apex of the secondary drogue 10. In this arrangement, shown in Figure 2, the rear rim or margin of the drogue 10 is provided with an enlarged rim 9, which may engage with spring clips 13 carried within the compartment 2. Since the secondary drogue 10 is in all forms small enough to pass into the compartment 2 through its opening 3, and the primary drogue 8 is always large enough to constitute a closure for the opening 3, in this form of Figure 2, in reeling in, the drogue 10 will come into contact with the brackets 13, its forward movement will be stopped thereby, and its balls 12 will disengage the collar 11, permitting the hose to be reeled in and the drogue to stay adjacent the opening 3 of the compartment. When the hose is subsequently reeled out, the spring brackets 13 will retain the secondary drogue 10 in position, permitting the length 7 of the hose to run through it, until the collar 11 reengages the detents 12, whereupon, due to the drag of the air stream on the primary drogue 8, the secondary drogue 10 will be pulled outwardly through the opening without the possibility of interference. It is believed that this form may be the more practical form inasmuch as deflection of the hose within the compartment 2 to the lip thereof would cause some impedance of the fixedly mounted drogue 10 in the form of Figure 3, and this would not so readily emerge from the opening 3.

I claim as my invention:

Airplane inflight refueling apparatus, for use on a tanker airplane which is formed with a compartment having a rearwardly facing opening of given size through which the refueling hose extends when in use, to deliver fuel to a receiver airplane which is formed with a forwardly projecting fuel-receiving probe, comprising in combination, a hose adapted for connection to a fuel supply tank, means upon the tanker airplane for letting out and pulling in the rear end of the hose with respect to said tanker airplane, a primary drogue upon the rearmost end of said hose for seating engagement with the probe, and of a size to close the tanker's rearwardly facing opening, a secondary drogue mounted upon the hose for sliding lengthwise of the rear end thereof, and of a size enough smaller than the tanker's rearwardly facing opening to enter the tanker's compartment, for stowage when not in use, detent means on the hose a short distance ahead of the primary drogue, engageable with the secondary drogue to retain the latter in such disposition when the hose is let out, and retainer means within but adjacent the compartment's rear opening to engage the secondary drogue during pulling in, and to disengage its detent means, whereby the hose will slide through the secondary drogue as the latter is retained adjacent the compartment's opening, and until such opening is closed by the primary drogue, and whereby the secondary drogue will be retained during subsequent letting out, until reengagement of said detent means.

References Cited in the file of this patent

UNITED STATES PATENTS

| 1,969,430 | Shinn | Aug. 7, 1934 |
| 2,480,145 | Lazarus et al. | Aug. 30, 1949 |
| 2,596,455 | Williams et al. | May 13, 1952 |

OTHER REFERENCES

"Flight" Magazine, page 203, August 23, 1945.